March 27, 1928.
A. F. MASURY ET AL
1,664,040
POWER PLANT MOUNTING
Filed Aug. 22, 1925
7 Sheets-Sheet 1
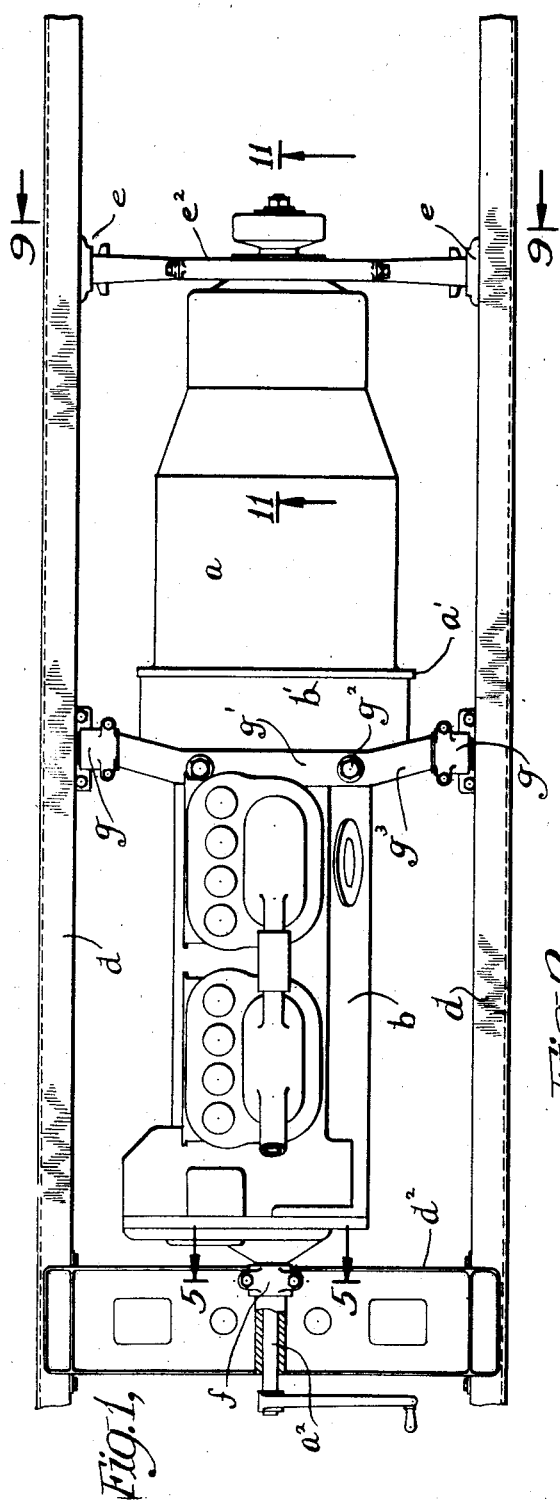
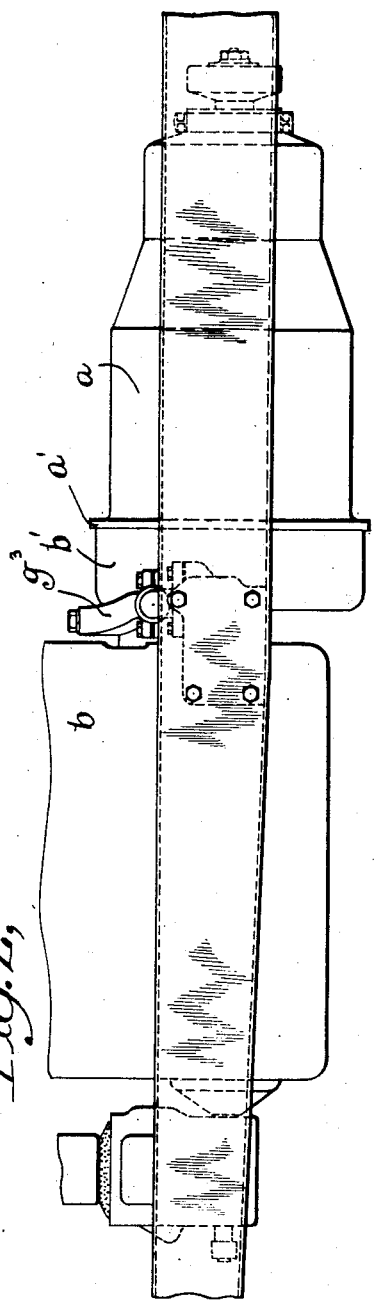
Inventors
ALFRED F. MASURY
CHARLES FROESCH
Attorneys March 27, 1928.
A. F. MASURY ET AL
1,664,040
POWER PLANT MOUNTING
Filed Aug. 22, 1925
7 Sheets-Sheet 2
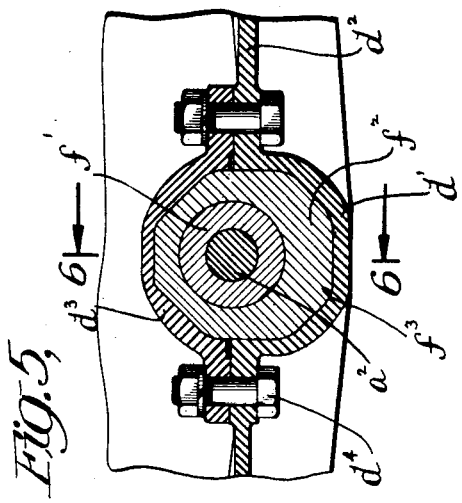
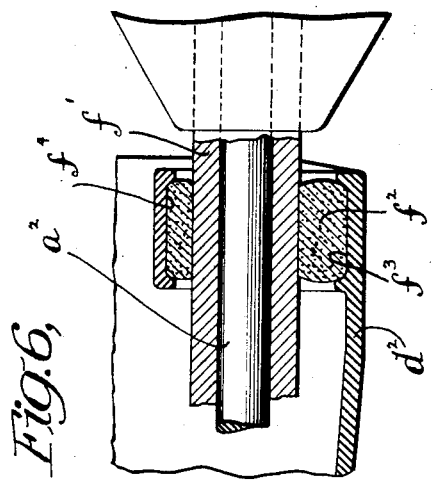
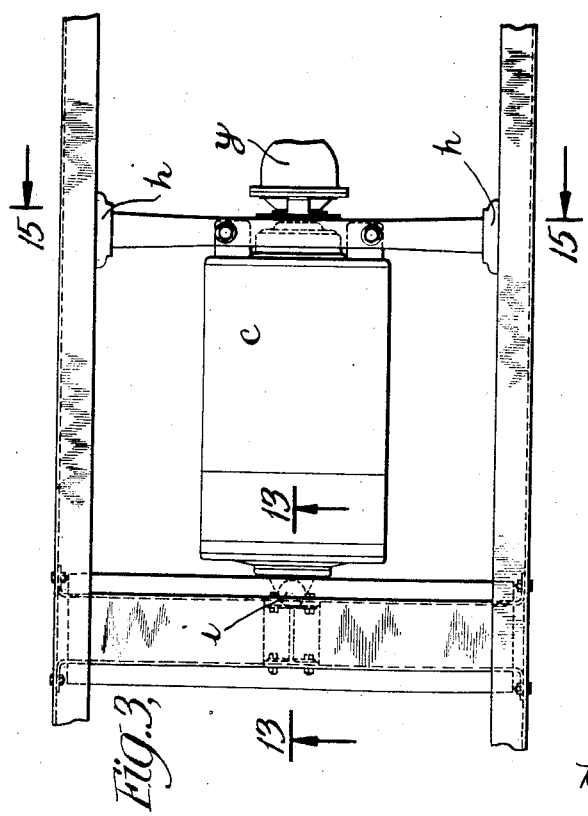
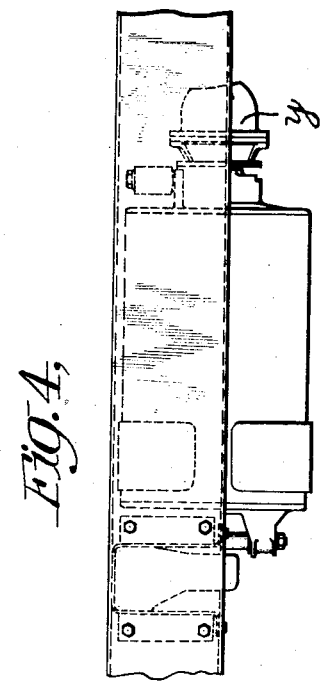
Inventors
ALFRED F. MASURY
CHARLES FROESCH
Attorneys March 27, 1928.
A. F. MASURY ET AL
POWER PLANT MOUNTING
Filed Aug. 22, 1925
1,664,040
7 Sheets-Sheet 3
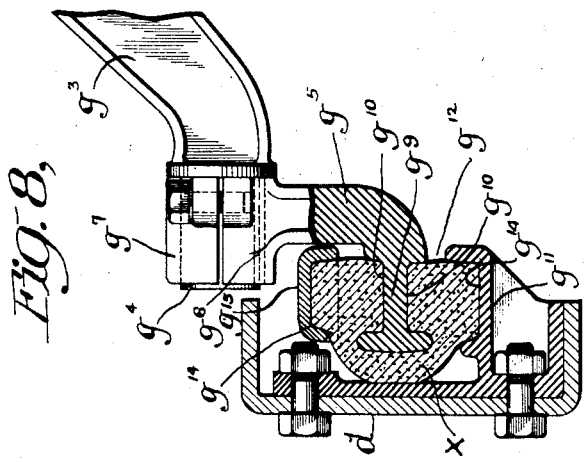
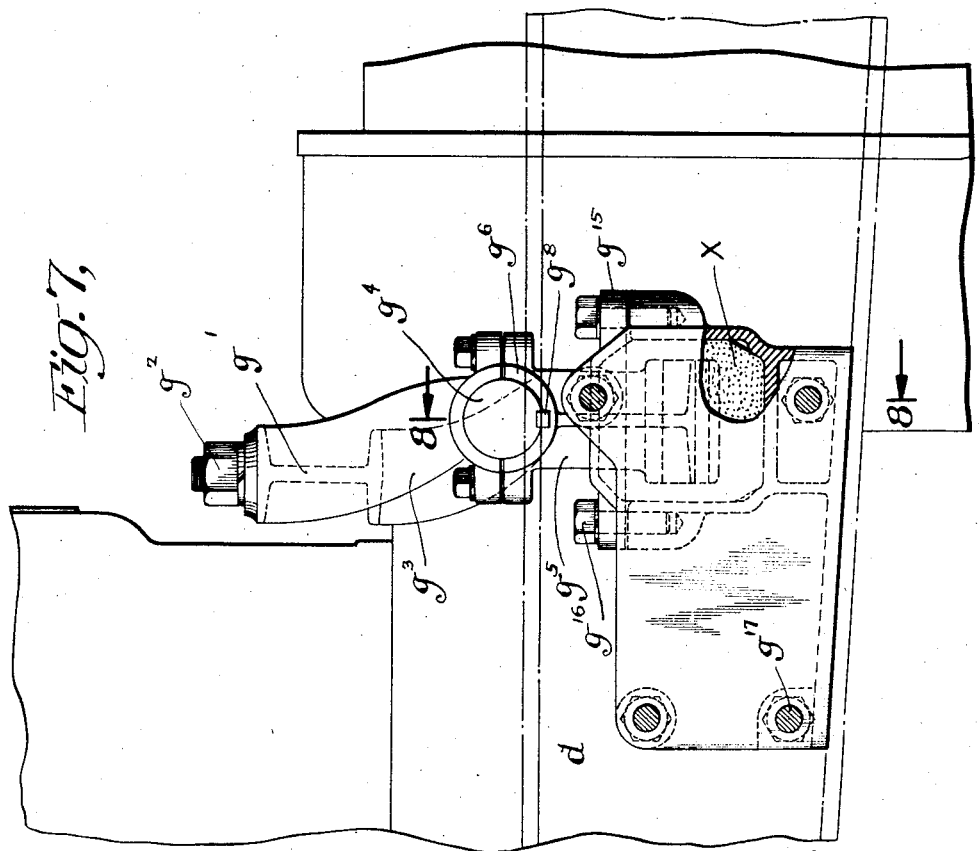
Inventors
ALFRED F. MASURY
CHARLES FROESCH
By their Attorneys
Redding, Greeley, O'Shea & Campbell March 27, 1928.  A. F. MASURY ET AL  1,664,040
POWER PLANT MOUNTING
Filed Aug. 22, 1925  7 Sheets-Sheet 4
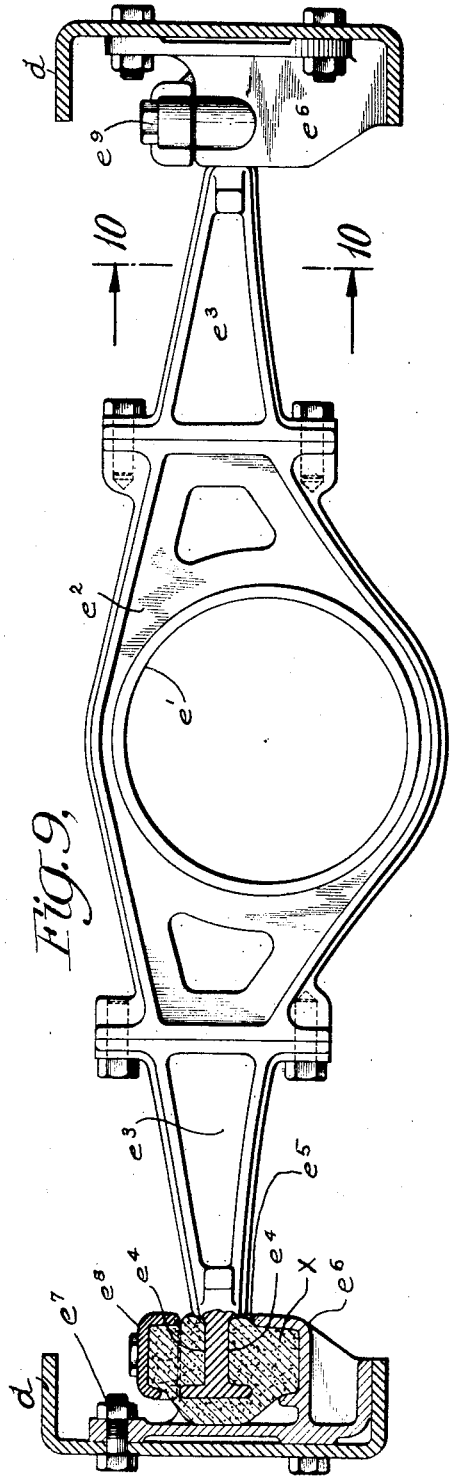
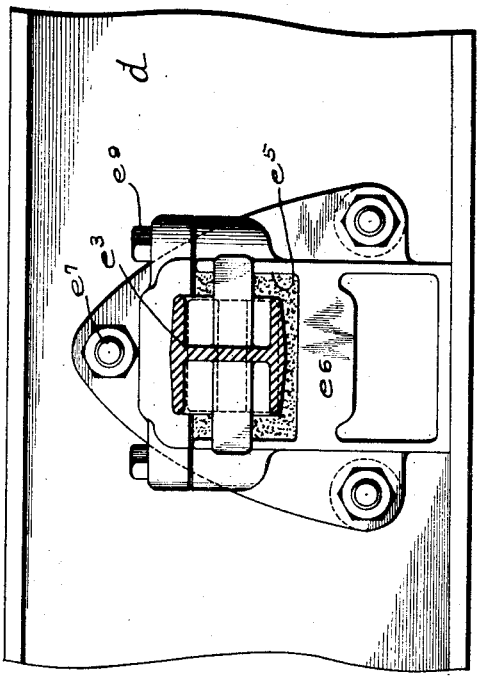
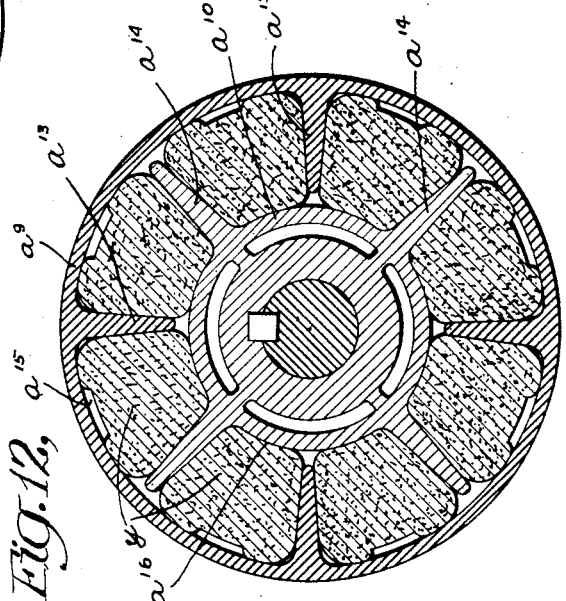
Inventors
ALFRED F. MASURY
CHARLES FROESCH
By their Attorneys
Redding, Greeley, O'Shea & Campbell

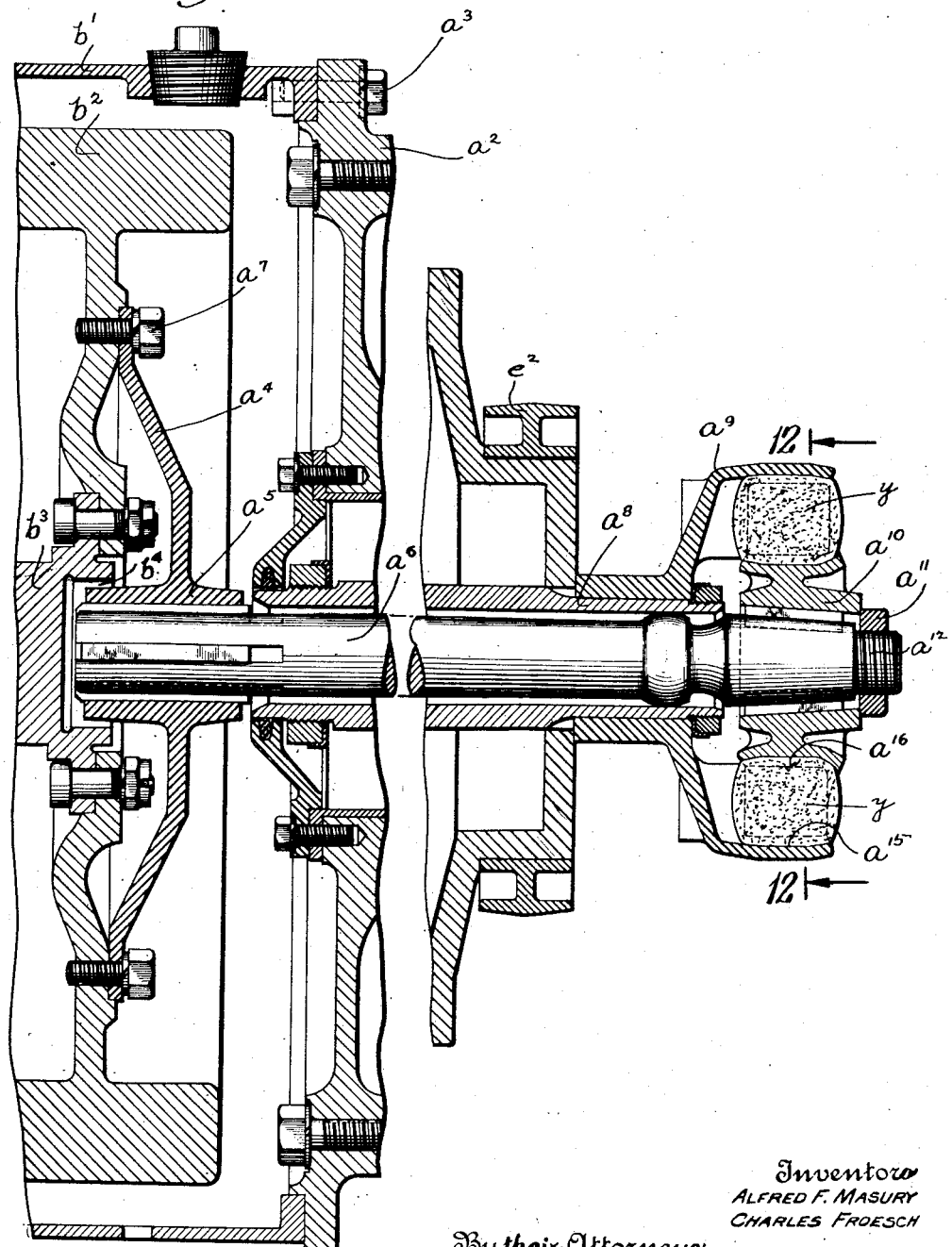

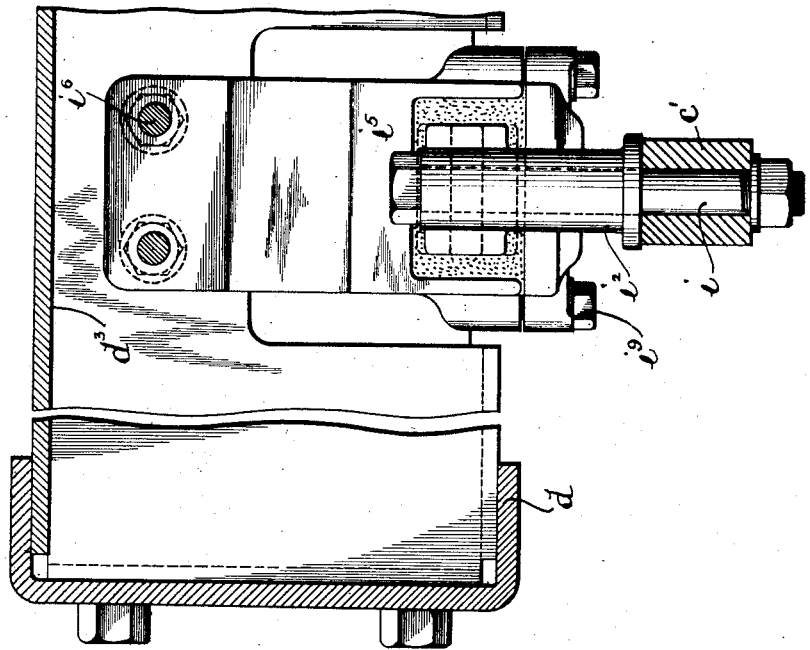
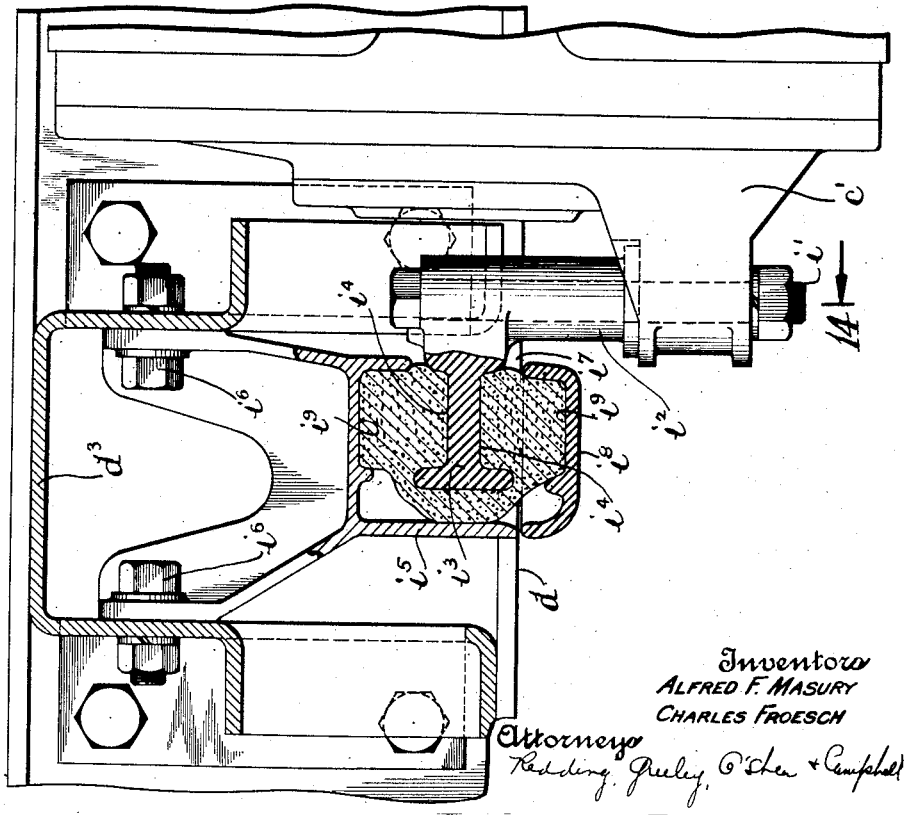

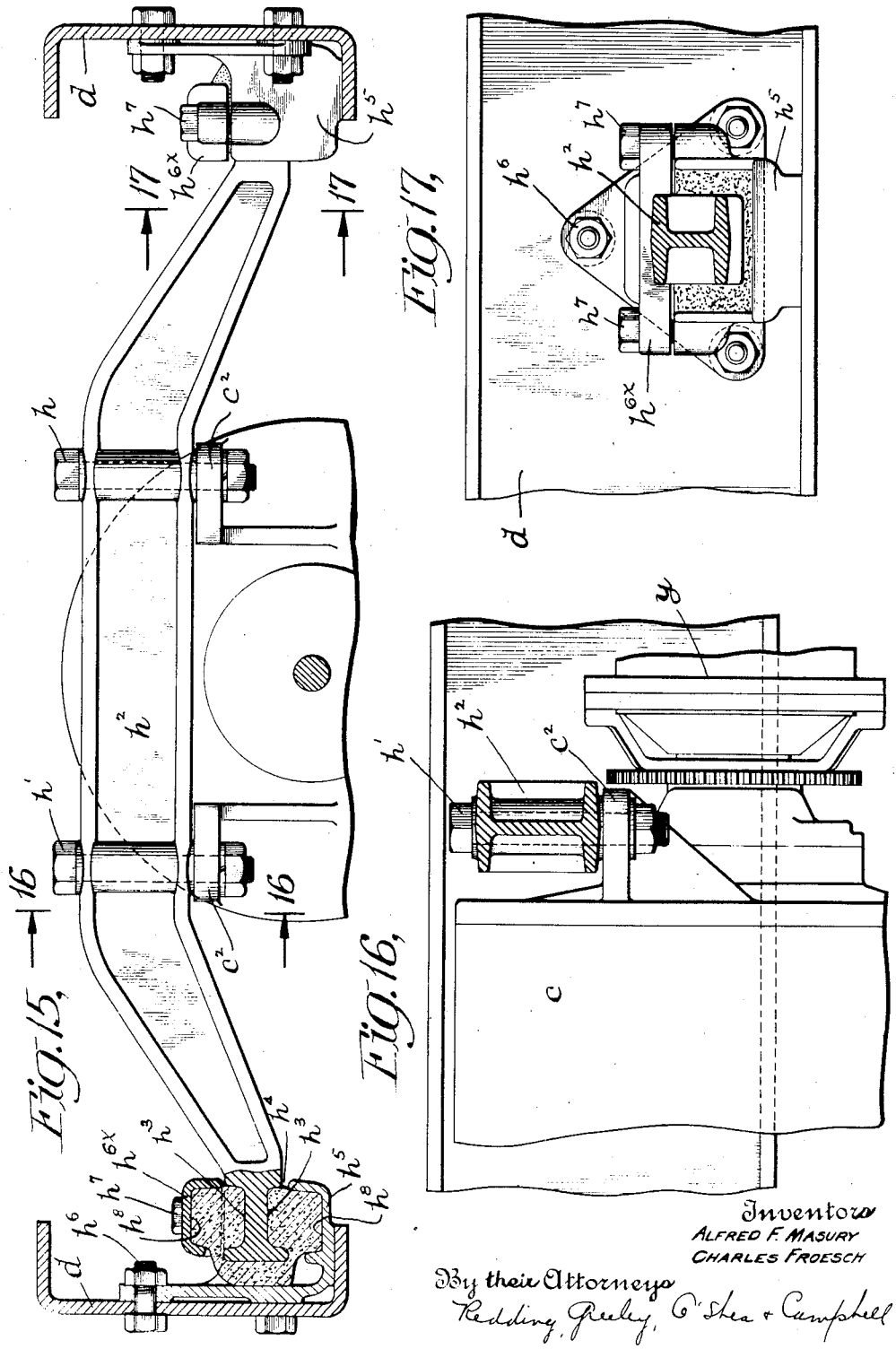

Patented Mar. 27, 1928.

1,664,040

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

POWER-PLANT MOUNTING.

Application filed August 22, 1925. Serial No. 51,806.

This invention relates broadly to a power plant involving an electric generator driven by an internal combustion engine and furnishing current to an electric motor. The primary object of the present invention is to provide an assembly wherein the torque, twisting stresses and turning moments of the component elements are compensated for or yieldingly resisted in a manner to relieve the connections to a great degree of stresses and strains. In accordance with one aspect of the invention the internal combustion engine and the electric generator are assembled as a unitary structure preferably by bolting the generator directly to the flywheel housing of the engine. More particularly the connections which contribute to the resistance of the torque stresses are disposed substantially in the transverse plane including the center of gravity of the combined structure of engine and generator. In the preferred embodiment five connections and supports are afforded, the two hereinbefore discussed, substantially in the plane of the center of gravity, one on either side of the unit, a pair at one end of the generator, one on either side thereof and a single connection and support at the opposite end of the unit in the longitudinal median line thereof. The rubber block connection at the front end of the engine is free to twist and thus the crank case is relieved of twisting stresses. The rear end of the generator is pivoted in a large diameter bearing thus rendering its frame free from twisting stresses. All of the features co-operate to provide an ideal load carrying assembly wherein torque cushioning is obtained. The invention also seeks to compensate or cushion the uneven torque moments of the crank shaft of the internal combustion engine in order that the drive of the generator may be accomplished with the minimum shock thereto. To this end advantage is taken of the tortional properties of a generator drive shaft of small diameter from which the drive is transmitted to the generator quill shaft through resilient elements or yielding non-metallic connections. The invention also has for its object the provision of a yielding connection and support for the motor which shall serve to cushion the torque set up by the motor in its operation as a prime mover as well as to compensate for possible misalignment of the motor shafts and propeller shaft in the case of self-propelled vehicles. In the illustrated embodiment the motor at the front is connected by a special bolt to a yielding non-metallic connection located directly at the center line and is thus free to twist under torque conditions. Thus the motor frame is relieved of stresses which would be present if the mounting were absolutely rigid. The invention also seeks to provide a mounting for the power plant which may be adapted to units of standard design without necessitating a departure from accepted automotive practice. These and other objects of the invention and the means for their attainment will be more apparent from the following detailed description of a preferred embodiment thereof, in which:

Figure 1 is a view, in plan, showing the internal combustion engine and the electric generator as a structural unit supported from the frame of a vehicle.

Figure 2 is a view in side elevation showing the structure illustrated in Figure 1.

Figure 3 is a plan view showing another section of the vehicle frame illustrated in Figure 1 and the manner of supporting the electric motor therefrom.

Figure 4 is a view in side elevation showing the structure illustrated in Figure 3.

Figure 5 is a view taken in the plane indicated by the line 5—5 in Figure 1 and looking in the direction of the arrows and showing the yielding support for the front end of the unitary structure comprising the internal combustion engine and the electric generator.

Figure 6 is a longitudinal vertical sectional view of the connection illustrated in Figure 5 taken in the plane indicated by the line 6—6 in that figure and looking in the direction of the arrows.

Figure 7 is a fragmentary view on an enlarged scale showing the connection at one side between the unitary structure of engine and generator whereby the torque of the engine is resisted.

Figure 8 is a detailed sectional view of the connection illustrated in Figure 7 being sectioned partially and taken in the plane indicated by the line 8—8 in Figure 7 and looking in the direction of the arrows.

Figure 9 is a view taken in the plane indicated by the line 9—9 in Figure 1 and looking in the direction of the arrows and showing the manner of supporting the rear end of the generator in a large diameter bearing which renders the frame of the generator free from twisting stresses.

Figure 10 is a detailed view of one of the connections illustrated in Figure 9 taken in the plane indicated by the line 10—10 in Figure 9 and looking in the direction of the arrows.

Figure 11 is a detailed view showing the driving connections between the internal combustion engine and the electric generator wherein uneven torque moments are cushioned by the distortion of a drive shaft coupled by the flywheel of an internal combustion engine before being transmitted to a torque insulator comprised of blocks of yielding non-metallic material serving as a cushioning connection with the generator quill shaft.

Figure 12 is a transverse vertical sectional view taken in the plane indicated by the line 12—12 in Figure 11 and looking in the direction of the arrows and showing the torque insulator connection between the driving shaft and the quill shaft of the electric generator.

Figure 13 is a detailed view partly in section, showing the connection between the frame and one end of the electric motor whereby the motor is rendered free to twist under torque conditions taken in the plane indicated by the line 13—13 in Figure 3 and looking in the direction of the arrows.

Figure 14 is a view showing the connection illustrated in Figure 13 taken in the planes indicated by the broken line 14—14 in Figure 13 and looking in the direction of the arrows.

Figure 15 is a view in elevation showing the connections between the frame and end of the motor opposite to that illustrated in Figures 13 and 14 taken in the plane indicated by the line 15—15 in Figure 3 and looking in the direction of the arrows.

Figure 16 is a detailed view of the connection between the transverse supporting member illustrated in Figure 15 and the end of the motor taken in the plane indicated by the line 16—16 in Figure 15 and looking in the direction of the arrows.

Figure 17 is a detailed view showing the yielding connection between the transverse frame member illustrated in Figure 15 and the vehicle frame taken in the plane indicated by the line 17—17 in Figure 15 and looking in the direction of the arrows.

The power plant according to the present invention consists generally of an electric generator $a$ driven by an internal combustion engine $b$ and an electric motor $c$ deriving its current from the generator. According to the broadest aspect of the invention this power plant may be supported upon any base. In the illustrated embodiment the power plant is shown as supported upon the side frame members $d$ of a self-propelled vehicle. The generator $a$ and engine $b$ are so associated as to form a unitary structure. Preferably the generator is bolted to the flywheel housing $b'$ of the engine as at $a'$. This unitary structure of engine and generator is supported from the frame members $d$ at five points. The connections at the respective ends of the unitary structure $e, e$, at the end of the generator and $f$ at the end of the motor are what may be termed strictly weight bearing connections and supports. Another set of connections $g, g$, between the structure and the frame is disposed substantially in the transverse plane including the center of gravity of the structure as a whole and these connections $g, g$ are adapted not only to support the structure but also to take all of the torque resulting from the operation of the engine. The electric motor is supported from the frame at one end at two points of support $h, h$, and at the other end at one point $i$ in the axis of the motor.

Referring now to the structure of the connections in detail the connection at $f$ will be found illustrated on an enlarged scale in Figures 5 and 6. The starting crank shaft $a^2$ is illustrated as turning within a sleeve $f'$. This sleeve is supported in an annulus $f^2$ of yielding non-metallic material supported in a seat $f^3$ formed in a bearing $d'$ formed in a cross member $d^2$ of the chassis frame. A bearing cap similarly formed with a seat $f^4$ for the yielding non-metallic material is indicated at $d^3$ and is adapted to be secured to the bearing $d'$ as by bolts $d^4$. The yielding non-metallic material is retained within the seats under internal static pressure through the instrumentality of the bolts $d^4$. The block $f^2$ is, by this construction, free to twist thereby relieving the crank case of twisting stresses.

The connection and support $g, g$, disposed substantially in the plane including the center of gravity of the unitary structure is illustrated in greater detail and on an enlarged scale in Figures 7 and 8. A transverse supporting member $g'$ is illustrated as bolted as at $g^2$ to the engine block and is provided with extremities $g^3$ which extend laterally, slightly rearwardly and downwardly and terminate in horizontally disposed turned portions $g^4$. Carried with each end $g^4$ is a bracket member $g^5$ formed with a half bearing $g^6$ adapted to co-operate with the bearing cap $g^7$ to clamp the end $g^4$, a key $g^8$ being also provided, if desired, to prevent relative movement between the bracket and end. The lower end of the bracket $g^5$ is provided with a laterally extending portion $g^9$ formed with opposed seats $g^{10}$, $g^{10}$ and this portion $g^9$ is adapted to extend within a housing $g^{11}$ formed with an open side $g^{12}$ through which the end $g^9$ extends to be engaged by a block of yielding non-metallic material $x$. The housing is also formed with seats $g^{14}$ to co-operate with the seats $g^{10}$ to contribute to the retention of the block within the housing and engaging the arm $g^9$. Preferably the upper portion of the housing as at $g^{15}$ is formed as a removable cap secured as by the bolts $g^{16}$ to the housing proper and by means of the bolts suitable compression may be exerted upon the block $g^{13}$. The housing $g^{11}$ may be secured in any convenient manner as by the bolts $g^{17}$ to the interior of the channel $d$. The center of gravity of the unitary structure comprised of the electric generator and internal combustion engine is substantially in the plane of this set of connections and these, therefore, are made to take the torque of the engine as well as to contribute to the support thereof, the structure being substantially equally balanced upon either side of the connections.

At the rear of the generator the connections $e$ are strictly weight bearing supports. The rear end of the generator is pivoted in a large diameter bearing $e'$ (Figure 9) carried in a frame element $e^2$ having transversely extending arms $e^3$ affixed thereto. Arms $e^3$ are provided at their extremities with seat portions $e^4$ adapted to extend within an opening $e^5$ formed in the housing $e^6$ secured as by bolts $e^7$ to the interior of the channels $d$. The upper portion of the housing as at $e^8$ is removable and secured to the main portion $e^6$ as by bolts $e^9$. Within the housing are disposed blocks of yielding non-metallic material $x$ which are retained under internal static pressure through the instrumentality of the bolts $e^9$.

The support for the electric motor, illustrated in Figures 3, 4, 13 and 17 as a three point support, comprises a connection $i$ directly on the center line of the motor and connections $h$, $h$, at the ends of a transverse member rigidly bolted at the rear. The connection at the front end of the motor comprises a bracket $c'$ carried with the front end of the motor in the longitudinal median line thereof but on the lowermost part of the housing. Bolted to the bracket $c'$ as by the bolt $i'$ is a sleeve $i^2$ having an arm $i^3$ formed thereon which arm is formed with seats $i^4$. This arm is adapted to enter through an opening $i^7$ the housing $i^5$ suspended from a transverse frame element $d^3$ as by the bolts $i^6$. Housing $i^5$ is formed with a removable side $i^3$ secured as by the bolts $i^9$ and the closure $i^8$ and main housing portion $i^5$ are formed with seat portion $i^9$ adapted to co-operate with the seats $i^4$ to retain a block $x$ of yielding non-metallic material which serves to engage the arm $i^3$ and function as a wholly non-metallic mechanical connection and support for the front end of the motor.

The other end of the motor is bolted as by the bolts $h'$ passing through lugs $c^2$ formed on the end of the motor to a transverse member $h^2$ having downwardly extending extremities formed with seats $h^3$. The extremities of the member $h^2$ enter through openings $h^4$ the housing $h^5$ secured as by the bolts $h^6$ to the inner sides of frame members $d$. These housings are substantially similar to the housings described in connection with the support for the rear end of the generator illustrated in Figures 9 and 10 and include a removable cover $h^{6x}$ secured as by the bolts $h^7$ and adapted to retain respectively blocks of yielding non-metallic material disposed between seats $h^8$ and the seats $h^3$ on the transverse member to function as wholly non-metallic mechanical connections and supports for the rear end of the motor. The electric generator, of course, delivers current to the electric motor which, in the illustrated embodiment, drives the propeller shaft (not shown) to the vehicle by a universal joint connection $y$, the current being delivered from the generator to the motor by electrical conductors disposed in any convenient manner about the frame.

Figures 11 and 12 illustrate the manner in which the generator is actuated by the internal combustion engine. The fly-wheel of the internal combustion engine is indicated at $b^2$ as disposed within the fly-wheel housing $b'$ to which the end member $a^2$ of the generator housing is bolted as by the bolts $a^3$. A flange $a^4$ carried upon a sleeve $a^5$ keyed to the drive shaft $a^6$ of the generator is bolted as at $a^7$ to the fly-wheel so that the crank shaft $b^3$ and drive shaft $a^6$ are substantially aligned although a clearance $b^4$ is provided for the end of the drive shaft $a^6$ to permit slight misalignment. The drive shaft is disposed within a tubular quill shaft $a^8$ which carries at its outer end a housing $a^9$. On the end of the shaft $a^6$ is keyed a seat member $a^{10}$ a nut $a^{11}$ on the threaded end $a^{12}$ being provided to permit ready removal of the seat member for assembly and disassembly. Radially disposed about the inner surface of the annular housing $a^9$ (Figure 12) are radially disposed fins $a^{13}$ and carried on the seat member $a^{10}$ are radially disposed fins $a^{14}$ interposed between successive fins $a^{13}$ in overlapping relationship. Between the fins on the inner surface of the housing $a^9$ there may be formed seats $a^{15}$ and co-operating seats $a^{16}$ may also be formed on the outer surface of the seat member $a^{10}$. Between adjacent fins there are disposed blocks of yielding non-metallic material $y$ retained, preferably, under compression. In previous designs some sort of cushioning device has been introduced between the end of the crank shaft and the generator drive shaft while a metallic connection has been used between the drive shaft and the quill shaft. By the present construction wherein a non-metallic cushioning device is disposed at the rear end of the generator between the end of the drive shaft and the quill shaft advantage is taken of the tortional properties of the generator drive shaft of small diameter before transmitting the drive to the generator quill shaft. Thus uneven torque movements are first cushioned by the distortion of the drive shaft before being transmitted to the torque insulator. The rubber blocks of the torque insulator then absorb the remainder of the torque movements thus delivering smooth torque action to the generator quill shaft while at the same time relieving to a degree the stress in the blocks.

By the construction just described a power plant is provided comprising a generator driven by the conventional gasolene engine and delivering current to an electric motor. The power plant is applicable in many situations and capable of a variety of uses. It may be mounted upon a stationary bed or supported in the chassis frame of a self-propelled vehicle. An easier operation is attained which is particularly advantageous for motor buses and other vehicles making a number of stops within a relatively short distance. In the preferred construction the generator has been bolted directly to the fly-wheel housing to form with the internal combustion engine a unitary power plant. The engine and generator assembly is mounted on five points of support to insure proper weight distribution and the center of gravity of the structure is substantially in the plane of the middle set of connections which are adapted to resist the torque of the engine. Preferably the structure is supported upon yielding connections which will be advantageously formed of non-metallic material which serve in greater measure to cushion the shocks and stresses which would otherwise be transmitted with undiminished intensity between the frame and power plant. The front end connection is free to twist thereby relieving the crank case of the engine of twisting stresses while the rear end of the generator is pivoted in a large diameter bearing thus relieving its frame of twisting stresses. An ideal load carrying assembly with torque cushioning qualities is thus obtained. The construction described is particularly convenient of assembly and disassembly. For instance, to disassemble, the fly-wheel housing bolts are removed and the generator moved rearwardly until the spline shaft is clear of the engine structure.

The electric motor is of the three point support type and is rigidly bolted at the rear to a cross member connected to the frame or base preferably by yielding connections which may take the form of non-metallic material. Such yielding connections either metallic or non-metallic take the motor torque. At the front of the motor a special bolt is connected to the yielding connection located directly on the center line of the electric motor and is thus free to twist under torque conditions. This is important as it relieves the motor frame from stresses that would occur if the mounting were absolutely rigid.

It is to be understood that the application of the power plant just described is not to be deemed limited to a self-aligned propeller vehicle nor the cushion connections limited to non-metallic material since in some situations metallic resilient devices may be availed of to provide a yielding support for the power plant.

Various modifications may be made in the configuration and disposition of the component elements constituting the connections and supports as illustrated and described without departing from the spirit and scope of the invention.

What we claim is:

1. The combination with a supporting frame, of an internal combustion engine and electric generator as a unitary structure exerting a thrust longitudinally of the frame, yielding non-metallic connections and supports between said structure and the frame disposed, respectively, substantially in the transverse plane including the center of gravity of the structure upon either side thereof to provide a relatively rigid connection to receive the thrust, and connections between the unitary structure and frame at either end thereof.

2. In a self-propelled vehicle, the combination with the vehicle frame, of an internal combustion negine and an electric generator as a unitary structure exerting a thrust longitudinally of the frame and yielding non-metallic connections and supports between said structure and the frame comprising transversely extending arms carried with the engine base, housings carried with the vehicle frame and each having an open side into which an arm extends respectively, substantially in the plane including the center of gravity of the structure, yielding non-metallic material retained within the housings and engaging the arms to provide a relatively rigid connection to receive the thrust, a bearing frame for the rear end of the generator having transversely extending arms, housings carried with the vehicle frame each formed with an open side into which the arms extend, respectively, yielding non-metallic material within the housings and engaging the arms, a bearing carried at the front of the vehicle frame for mounting the other end of the unit and yielding non-metallic material disposed within the bearing and engaging the sleeve whereby the unit will be carried in a floating suspension in which the thrust is taken at the center of gravity of the unit.

3. In a self-propelled vehicle, the combination with the vehicle frame, of an electric motor and yielding non-metallic connections and supports between the motor and the frame comprising a transverse member carried with one end of the motor housing, housings carried with the frame and having open sides, respectively, into which the ends of the transverse member extend, yielding non-metallic material disposed within the housings and engaging the ends of the member, a vertical arm carried centrally at the other end of the motor, means to mount the arm to secure it against axial movement with respect to the motor to permit it to swivel in a horizontal plane, a housing carried with the vehicle frame and having an opening in one side into which the arm extends and yielding non-metallic material disposed within the housing and engaging the end of the arm.

This specification signed this 18th day of August, A. D. 1925.

ALFRED F. MASURY.
CHARLES FROESCH.